United States Patent [19]

Hasebe

[11] 3,937,795

[45] Feb. 10, 1976

[54] DESULFURIZING PROCESS FOR HYDROGEN SULFIDE-CONTAINING GASES

[76] Inventor: Nobuyasu Hasebe, No. 24-8, 2-chome, Nishiogi-kita, Suginami, Tokyo, Japan

[22] Filed: Feb. 4, 1974

[21] Appl. No.: 439,616

Related U.S. Application Data

[63] Continuation-in-part of Ser. No. 210,249, Dec. 20, 1971, abandoned.

[30] Foreign Application Priority Data

Dec. 21, 1970   Japan.............................. 45-114904

[52] U.S. Cl. ............ 423/573 G; 423/226; 423/236; 423/243; 423/366
[51] Int. Cl.² .................... C01B 17/04; B01D 53/34
[58] Field of Search ........... 423/232, 235, 233, 243, 423/226, 227, 573, 224, 236, 571, 366

[56] References Cited
UNITED STATES PATENTS
3,459,495   8/1969   Iida et al............................. 423/226

FOREIGN PATENTS OR APPLICATIONS
672,084   10/1963   Canada.............................. 423/226

Primary Examiner—Earl C. Thomas
Attorney, Agent, or Firm—Haseltine, Lake & Waters

[57] ABSTRACT

A process is disclosed for the desulfurization of gases containing hydrogen sulfide, as well as their decyanization and removal of sulfurous acid when the gases contain hydrogen cyanide or sulfurous acid and in which process a napthoquino chelate compound is employed on a component of an absorption medium.

9 Claims, 1 Drawing Figure

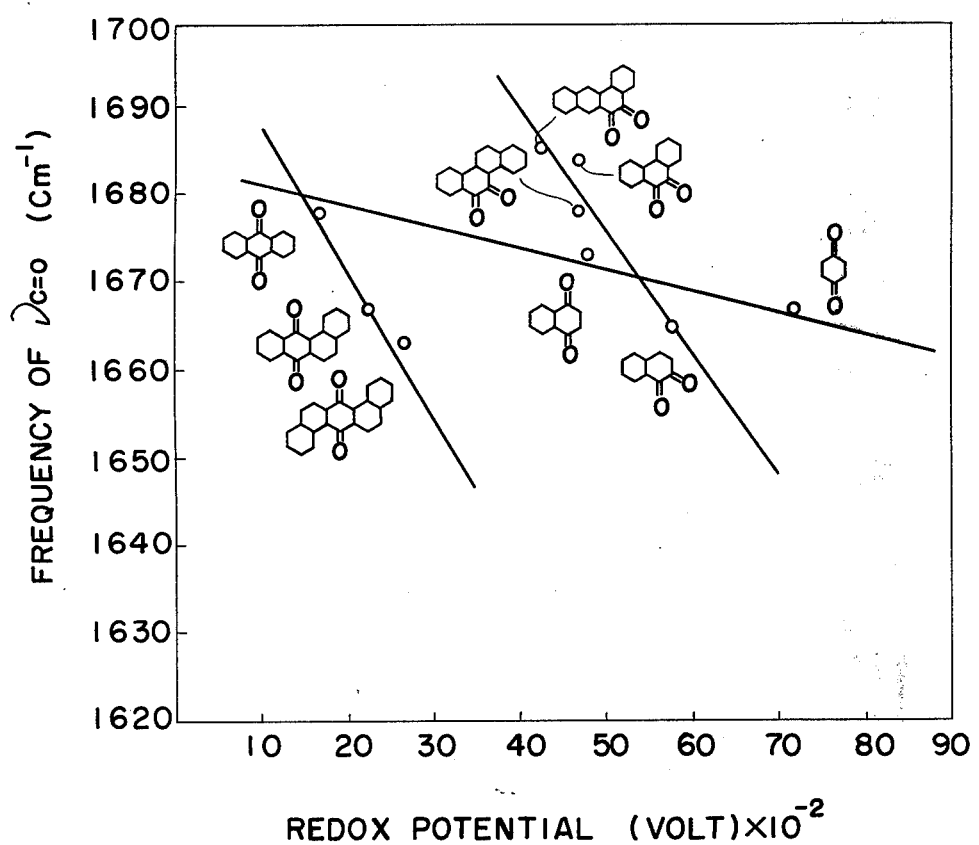

DESULFURIZING PROCESS FOR HYDROGEN SULFIDE-CONTAINING GASES

BACKGROUND OF THE INVENTION

This application is a continuation-in-part of copending application Ser. No. 210,249, filed Dec. 20, 1971 and entitled "Desulfurizing Process for Hydrogen Sulfide-Containing Gases", and now abandoned.

This invention relates to a process for treating gases which contain hydrogen sulfide and in which gases there may also be present hydrogen cyanide and sulfurous acid and the like. More particularly, the invention relates to a wet process for treating gases which contain the above-mentioned materials and in which process hydrogen sulfide is recovered as sulfur, hydrogen cyanide, if present in the gas being simultaneously caught as a thiocyanate by atomic sulfur formed as a by-product and sulfur dioxide, if also coincidentally present likewise being removed from the gases.

A number of processes for the wet desulfurization of gases containing hydrogen sulfide are well known, such as the Seaboard process, the Thylox process and the Giammarco process. These processes have become famous as the conventional processes from the wet desulfurization of hydrogen sulfide-containing gases. However, these known processes still exhibit certain insufficencies and defects. For example, in the Seaboard process, the absorbed hydrogen sulfide is discharged into the air during regeneration of the absorption medium, consequently this process results in air pollution, causing decay and damage in animals and plants and, as well, discoloration and corrosion of metal wares. In the Thylox process, a poisonous arsenite is employed for desulfurization, therefore, handling of the materials and operation of the process involve dangers. Moreover, complicated operations, such as water washing and extraction must be conducted for removal of the arsenite from recovered sulfur. In the Giammarco process, a condensed solution containing an arsenite at a concentration many times higher than that of the Thylox process is employed as the desulfurization catalyst. Accordingly, even greater care must be taken when handling the catalyst than in the Thylox process and the removal of the arsenite from the recovered sulfur must be conducted repeatedly.

In addition to the process discussed above, a further desulfurization process using benzoquinone has been proposed. However, since the oxidation-reduction potential of benzoquinone is as high as about 0.7 volt as shown in Table 1 given hereinafter, its autocatalytic activity is high and its catalytic life is very short. Consequently, this process is of no practical value.

This is also true with respect to the Stretford process which employs an anthraquinone-2,5 or 2,6-disulfonate as a catalyst component such component having a low oxidation-reduction potential of about 0.228 volt and, therefore, sufficient desulfurizing effect cannot be obtained even when it is used in a very large quantity. In order to obviate the disadvantage of the Stretford process, there was proposed a process in which a metal, such as vanadium, arsenic or iron, an alkali salt and a tartarate are used in combination. This process is one in which the desulfurization principles of each of the Thylox, Giammarco and Vetrocoke processes are utilized in combination and a certain effect is attained therewith. (See Canadian Pat. No. 672,084). However, the Stretford process or its modification is nothing more than a mere combination of the Thylox process with other known techniques, and in both post treatments should be conducted to remove vanadium or the like and arsenic. Furthermore, the desulfurizing effect attained by the Stretford process or its modification is insufficient. For these reasons, neither is of practical value.

Another very effective process for desulfurization of hydrogen sulfide-containing gases in which an acidic group is introduced into a quinone or hydroquinone or a salt thereof to render it water-soluble and the resulting water-insoluble quinone or hydroquinone derivative is used as the catalyst is also known (see U.S. Pat. No. 3,459,495).

Although the foregoing defects of the conventional processes can be overcome by this last mentioned process, it is still insufficient for the following reasons. The desulfurizing activity of the absorption medium can be exerted only about one day after packing of the absorption medium into an absorption tower. Further, since the rate of the oxidation reaction is relatively low, it is necessary to provide an oxidation tower of a very large size and feed a large quantity of air to the oxidation tower. Accordingly, if it is desired to treat large quantities of gases, the equipment size must be greately enlarged with consequent enlargement of the operation area, and a very large amount of the absorption medium must be circulated through the equipment.

There exists, therefore, a need for a process which overcomes the disadvantage and defects of the above-mentioned processes and the present invention fulfills this need.

THE OBJECT OF THE INVENTION

It is a primary object of this invention to provide an absorption medium for desulfurization which can desulfurize a hydrogen sulfide-containing gas at a high efficiency.

Another object of this invention is to provide a desulfurization process in which by utilizing a high catalytically active naptho-quino chelate compound it is possible to employ neutral and acidic aqueous solutions as well as alkaline aqueous solutions.

It is still another object of this invention to provide a desulfurization process in which an aqueous solution of glycerin, ethyleneglycol monoethyl ether or di-n-butylamine which have a high dissolving power to hydrogen sulfide and sulfur dioxide are employed as the absorption medium.

The foregoing and other objects are attained by this invention as is readily apparent from the following detailed description thereof which is to be taken in conjunction with the sole figure of the accompanying Drawing.

THE DRAWING

The drawing illustrates a curve showing the relation between the frequency of $\gamma c{=}0$ (in $cm^{-1}$) and the redox potential (volt $\times 10^{-2}$) in benzoquinone, naphthoquinone and anthraquinone compounds. From the drawing, it is seen that naphthoquinone compounds to be used in this invention have an appropriate redox potential.

SUMMARY OF THE INVENTION

In accordance with the invention, the foregoing disadvantages and shortcomings or defects of desulfurization processes are overcome by providing a process for the desulfurization of hydrogen sulfide-containing gases comprising contacting such gases with an absorption medium comprising a naphthaquino chelate compound as a catalytic component of the absorption medium and increasing the rate of oxidative activation of the desulfurization catalyst by such compound which is formed by aging for an appropriate time a mixture of (A) a hydrogen-sulfide-oxidizing catalyst formed by introducing into a quinone or hydroquinone an acid group, a salt thereof, a thioglycol group, a thiol group, a hydrozyl group, a lower alkyl group having 1 to 3 carbon atoms or a lower alkoxy group having 1 to 3 carbon atoms so that the standard oxidation reduction potential $E_o$ of the catalyst is within a range of from 0.45 to 0.7 volt, and (B) a precursor of a chelating agent formed by reacting a compound of a metal selected from metals belonging to groups V, VI, VII and VIII in the fourth period of the Periodic Table with an aliphatic carboxylic acid or hydroxycarboxylic acid, the chelate compound so formed being stable in the presence of hydrogen sulfide, absorbing the hydrogen sulfide into the absorption medium, contacting the absorption medium with oxygen and converting the hydrogen sulfide to sulfur, while regenerating the naptho-quino chelate compound, recirculating the regenerated chelate compound for further use and recovering hydrogen sulfide-free gases. In addition, the process of this invention also includes the decyanization of the hydrogen sulfide-containing gases when hydrogen cyanide is present in the gases, the hydrogen cyanide being caught and removed as a thiocyanate by activated atomic sulfur, as well as the conversion of sulfurous acid gas, that is sulfur dioxide, to sulfur when sulfurous acid gas is present in the hydrogen sulfide-containing gases. Consequently, sulfurous acid gas or sulfur dioxide in the gases being treated is coincidentally removed.

Expressed in another manner, the subject invention comprises an improved process in which hydrogen sulfide-containing gases are passed through an aqueous medium containing (1) a material having an oxidation-reduction potential in an aqueous solution at 25°C. of 0.45 to 0.70 v and which material is selected from the group consisting of derivatives of quinones, hydroquinones and their salts, and (2) a chelated complex compound having the formula $$(Alk\text{-polyoxypolycarbonate})_n M''$$

wherein Alk is an alkali metal atom or ammonium ion, $M''$ represents a metal selected from metals belonging to Groups V, VI, VII and VIII in Period IV of the Periodic Table and $n$ represents a number from 1 to 3, in the presence of molecular oxygen, thereby simultaneously desulfurizing the gas and regenerating the absorbent solution.

DESCRIPTION OF PREFERRED EMBODIMENTS

In carrying out the practice of this invention, there may be employed as metals of Groups V, VI, VII or VIII in the fourth period of the Periodic Table, for example, vanadium, chromium, manganese, iron, cobalt and nickel, as well as arsenic and selenium. Vanadium and iron are especially preferred.

As the aliphatic carboxylic acid or hydroxycarboxylic acid that can be employed in carrying out the process of this invention, there can be mentioned, for example, oxalic acid, citric acid, tartaric acid, glutaric acid and the like.

The reaction of a compound of the above-mentioned metals, such as a hydroxide or chloride, with the aliphatic carboxylic acid or hydroxycarboxylic acid is conducted in water or an alcohol at an appropriate pH, generally ranging from 4 to 10 according to customary methods. The so formed chelating agent precursors are represented by the following general formula:

$$(Alk\text{-}Y)_n M''$$

wherein Alk stands for an alkali metal or ammonium group, $M''$ designates a metal belonging to Groups V, VI, VII or VIII in the fourth period of the Periodic Table, $n$ represents a number from 1 to 3 and Y is an acid or hydroxyl residue of the aliphatic carboxylic acid or hydroxycarboxylic acid.

Examples of the chelating agent precursor obtained by employing tartaric acid or its alkali salt as the starting material are as follows:

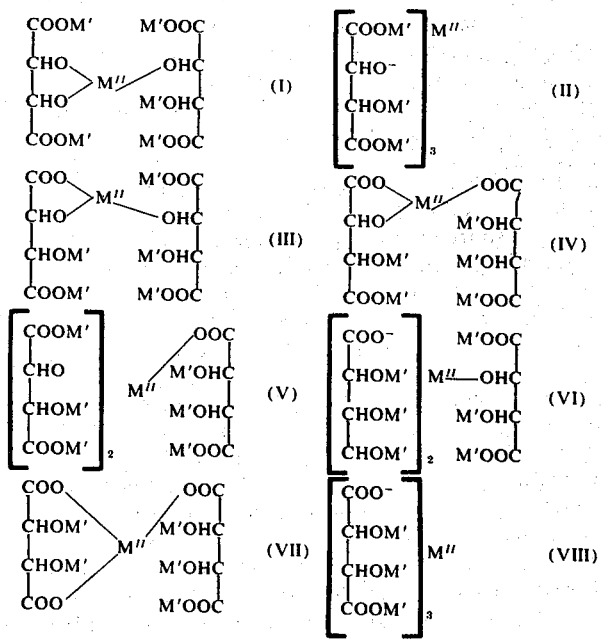

wherein M' is hydrogen, ammonium or an alkali metal such as sodium and potassium and M'' is as defined above and preferably vanadium or iron.

The amount of the chelating agent precursor employed in accomplishing the process of this invention can vary widely being optionally chosen, and sufficient and satisfactory results can be obtained when it is added in an amount of from about 0.01 to about 50% by weight, based on the quinone or hydroquinone compound employed.

The utilization of a chelating agent precursor, such as mentioned above provides a further advantage in that even when the metal has come into contact wiith hydrogen sulfide in the absorption liquid, precipitation of a metal sulfide is prevented by its protective activity.

The quinone or hydroquinone compounds suitable for use in this invention are those which may be chelated by some treatment or other and have a solubility in water or organic solvent containing water without polymerization activity. As suitably useful quinone or hydroquinone compounds meeting such conditions, there can be mentioned those having a group such as those set forth below and having an oxidation-reduction potential ranging from about 0.45 to about 0.7 volt, measured at 25°c.

Groups to be introduced a. sulfonic group (—SO₃H)
b. carboxylic group (—COOH)
c. alkali metal or alkaline earth metal salts of acid groups (a) and (b) (—SO₃Na, —COONa, etc.)
d. thioglycol group (—S—CH₂—COOH)
e. thiol group (—SR in which R is an alkyl group)
f. hydroxyl group (—OH)

These groups (a) to (f) are hereinafter referred to merely as "radicals". Quinones and hydroquinones which can be used in this invention are represented by the following general formulae:

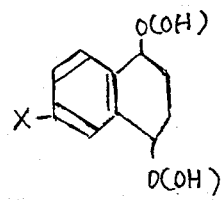

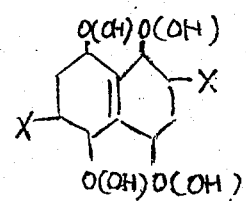

wherein O(OH) stands for a quinone or hydroquinone structure and X designates a radical such as those mentioned above.

In the above formulae, the position of O(CH) is merely a typical illustrative instance and it can be attached to any optional position. For example, the α-type is shown above with respect to the naphthoquinone, but the β-type is included in the naphthoquinones which can be used in this invention. Further, the radical X can be attached to any optional position other than the position to which O(OH) is attached. Moreover, the number of the radical X present is also optional. Specific examples of the radical-introduced quinonens and hydroquinones that can be used in this invention are as follows:

| Compound | Structural Formula |
|---|---|
| 1,4-naphthoquinone | |
| 1,2-naphthoquinone | |
| 1,4-naphthoquinone-2-sulfonic acid and its salt | |
| 1,2-naphthoquinone-4-sulfonic acid and its salt | |
| 1,4-naphthoquinone-2-carboxylic acid and its salt | |
| 1,2-naphthoquinone-4-carboxylic acid and its salt | |

-continued
| Compound | Structural Formula |
|---|---|
| 2-methyl-1,4-naphthoquinone | 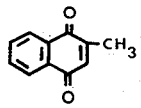 |
| 2,3-dimethyl-1,4-naphthoquinone | 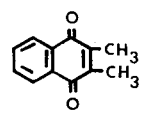 |
| 2,5-dimethyl-1,4-naphthoquinone | 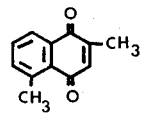 |
| 2,6-dimethyl-1,4-naphthoquinone | 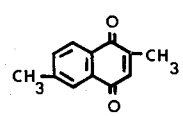 |
| 2-methyl-1,4-naphthoquinone-3-sulfonic acid and its salt | 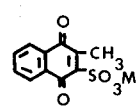 |
| 2-alkylthio-1,4-naphthoquinone | 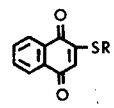 |
| 2-carboxymethylmercapto-1,4-naphthoquinone | 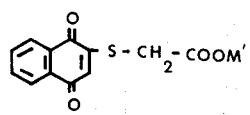 |
| 1,4,5,8-naphthodiquinone | 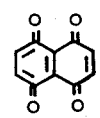 |
| 1,2,3,4-naphthodiquinone | 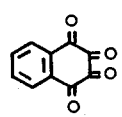 |
| 2-hydroxy-1,4-naphthoquinone | 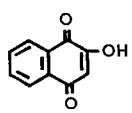 |

| Compound | Structural Formula |
|---|---|
| 5-hydroxy-1,4-naphthoquinone | |
| 6-hydroxy-1,4-naphthoquinone | |
| 2,5-dihydroxy-1,4-naphthoquinone | |
| 2,6-dihydroxy-1,4-naphthoquinone | |
| 2,7-dihydroxy-1,4-naphthoquinone | |
| 2,8-dihydroxy-1,4-naphthoquinone | |
| 5,6-dihydroxy-1,4-naphthoquinone | |
| 5,8-dihydroxy-1,4-naphthoquinone | |
| 2,5,8-trihydroxy-1,4-naphthoquinone | |
| 3,5,7-trihydroxy-1,4-naphthoquinone | |
| 2,3-dihydroxy-1,4-naphthoquinone | |

-continued

| Compound | Structural Formula |
|---|---|
| 6,7-dihydroxy-1,4-naphthoquinone | 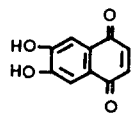 |
| 2,3,6-trihydroxy-1,4-naphthoquinone | 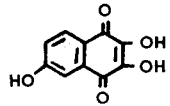 |
| 2,3,5,8-tetrahydroxy-1,4-naphthoquinone | 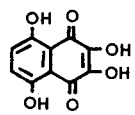 |
| 5,6,8-trihydroxy-1,4-naphthoquinone |  |
| 2-methoxy-1,4-naphthoquinone | 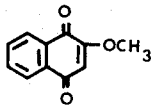 |
| 2-methoxy-3-hydroxy-1,4-naphthoquinone | 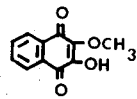 |

The oxidation-reduction state and the deposition of sulfur are shown in the following table with respect to 45 typical quinone compounds.

Table

| Oxidized Form | $E_o$ as measured at 25°C. (volt) | State of Sulfur Deposition |
|---|---|---|
| o-benzoquinone | 0.787 | no sulfur precipitate, extreme formation of tionic acid |
| 3-hydroxy-o-benzoquinone | 0.713 | small amount of sulfur precipitate |
| p-benzoquinone | 0.699 | " |
| 1,4-naphthoquinone | 0.484 | sulfur precipitate |
| 9,10-anthraquinone | 0.154 | no sulfur precipitate |
| 1,2-naphthoquinone-4-sulfonic acid | 0.628 | sulfur precipitate |
| 1,4-naphthoquinone-2-sulfonic acid | 0.533 | good precipitation of sulfur |
| 1,4-naphthoquinone-2,3-dicarboxylic acid | — | sulfur precipitate |
| 2-hydroxy-1,4-naphthoquinone | 0.351 | " |
| 5-hydroxy-1,4-naphthoquinone | 0.452 | " |
| 4-amino-1,2-naphthoquinone | 0.352 | " |
| 9,10-anthraquinone-2-sulfonic acid | 0.187 | very slow and insufficient precipitation of sulfur |
| 1,2-anthraquinone-4-sulfonic acid | — | " |
| anthraquinone-2,6-disulfonic acid | 0.228 | " |

| Oxidized Form | $E_o$ as measured at 25°C. (volt) | State of Sulfur Deposition |
|---|---|---|
| 1-hydroxy-9,10-anthraquinone | 0.132 | no sulfur precipitate |

In this invention, the above-mentioned quinone or hydroquinone is mixed with the chelating agent precursor, and the mixture is aged. The aging is conducted over a wide time range generally from as short as about 10 minutes to about 12 hours and preferably about 30 minutes to about 3 hours. The resulting naphtho-quino chelate compound is used as an absorption medium in the form of an aqueous solution of a concentration of 0.01 to 500 mole/Kl, preferably 1 to 20 mole/Kl.

One of the features of this invention is that an aqueous solution to be used as the absorption medium can have a pH value of a broad range of generally from about 3 to about 10. In view of the fact that in the conventional methods known desulfurization is possible only in an aqueous solution, it will readily be understood that the process of this invention can be applied broadly in various fields.

Furthermore, the aqueous solution employed as the absorption medium can also contain an organic solvent such as ethyleneglycol, diethyleneglycol, glycerin, compounds having the formula $R_1O-(CH_2)_2-OH$ in which $R_1$ is an alkyl group having 1 to 4 carbon atoms, and di-n-butylamine. These organic solvents may be incorporated into the absorption medium alone or as mixtures of two or more of them. The ether type compounds are more preferred than the glycol type compounds. The aqueous solution may comprise up to 98% of glycol, ethyleneglycol or diethylene glycol or up to 97% of 2-ethoxyethanol, 2-methoxyethanol, 2-propoxyethanol or 2-butoxyethanol. In the case of di-n-butylamine, the upper limit of the concentration is 50%.

Glycol and its derivatives and 2-ethoxyethanol and its derivatives are used because of their high dissolving powers towards hydrogen sulfide and sulfur dioxide. More specifically, by utilizing such high dissolving powers, sulfur dioxide and hydrogen sulfide in a gas to be treated are transferred to such solvent to cause a reaction between them in the following manner:

$$SO_2 + H_2S = H_2O + 2S \downarrow$$

Then, excess hydrogen sulfide is oxidized by the naphthoquino chelate compound in the solvent or water to precipitate sulfur. Di-n-butylamine is used for attaining good precipitation and separation of sulfur. More specifically, when di-n-butylamine is added and the temperature is elevated according to need, it exhibits an activity which results in formation of coarse particles of precipitated sulfur, and hence, sulfur can be separated very easily.

When hydrogen cyanide is contacted with sulfur of ordinary form, it hardly reacts with the sulfur, and hence, there is practically no conversion to thiocyanate. In contrast, if sulfur is in the atomic state, hydrogen cyanide reacts with it very readily and it is easily converted to a thiocyanate. When the naphtho-quino chelate compound of this invention is present, atomic sulfur is readily formed and in a particle size distribution in which the maximum particle size is within a range of from about 0.01 to about 2μ. As may be readily understood from this fact, sulfur is in a highly active state, and it reacts with hydrogen cyanide to form a thiocyanate as follows:

$$HCN + \text{atomic } S \rightarrow HCNS$$

An instance of the sulfur particle size distribution in the absorption liquid observed when the operation is continued for 15 hours is as follows:

| particle size (μ) | amount of particles (%) |
|---|---|
| below 0.1 | 80 |
| 0.1 to 1 | 15 |
| 1 to 2 | 5 |

In general, the desulfurization process of this invention using the above-mentioned naphtho-quino chelate compound is continuously carried out by employing an absorption tower and an oxidation tower. More specifically, the above-mentioned absorption medium is sprinkled from the head of the absorption tower and is contacted with a hydrogen-sulfide-containing gas introduced from the bottom of the tower to absorb hydrogen sulfide in the absorption medium. The hydrogen sulfide-absorbed liquid is fed to the oxidation tower, and by blowing oxygen in the formed air, oxygen or an oxygen-containing gas under atmospheric or elevated pressure into the oxidation tower, sulfur is precipitated. Simultaneously, the catalyst is converted to the oxidized form again and is recirculated to the absorption tower.

However, the process of this invention can also be carried out in one column or tower and divided into two portions, one portion being an absorption zone and the other portion being an oxidation zone. It is also possible to charge the absorption medium in one column and feed a hydrogen sulfide-containing gas and air or oxygen simultaneously into this column to effect absorption and oxidation coincidentally in the one column. Moreover, in the practice of this invention, when a gas to be treated is a sulfur dioxide-containing gas such as a gas which is to be fed to a Claus furnace, it is possible to incorporate a water-insoluble naphthoquinone compound into the reaction mixture, convert it to a water-soluble sulfonate during the operation and use it repeatedly as the catalyst component.

Since the naphtho-quino chelate compound has a high oxidation rate, the residence time in the oxidation tower can be reduced to one half or one third as compared with conventional naphthoquinone derivatives. Furthermore, the amount of oxygen require can also be reduced, and hence, excessive oxidation can be prevented. Moreover, since the conversion of hydrogen sulfide to sulfur is highly accelerated, the alkalinity of the absorption medium can be lowered and a neutral or acidic aqueous solution can be used according to need. In addition, in the case where a solution of the naphtho-quino chelate compound in a mixture of an organic solvent and water is used as the absorption medium, the occurrence of a series of sodium thiosulfate forming reactions, such as those represented by the following equation:

$$Na_2S \rightarrow Na_2S_2O_3$$

can be prevented.

THE EXAMPLES

In order to illustrate the invention more fully, the following illustrative example is set forth. It is to be understood that the example is illustrative and not limitative. In the example all parts and percents are by weight unless otherwise indicated.

EXAMPLE 1

Synthetic resin fillers having a diameter of 15 mm were packed to a height of 800 mm into a glass tube having an inner diameter of 50 mm and a length of 100 mm. An absorption medium such as set forth below was sprinkled into the tube from the top and a hydrogen sulfide-containing gas was introduced from the bottom of the tube to flow in counter-current contact with the absorption medium and absorb hydrogen sulfide in the absorption medium. Then, the absorption medium was introduced into an empty glass tube having an inner diameter of 50 mm and a length of 1000 mm and air was blown into this tube to precipitate sulfur. The precipitated sulfur was removed from the absorption medium which was then recirculated to the absorption tube.

Run 1

Sodium 1,4-naphthoquinone-2-sulfonate was used as the catalyst and compound (I) disclosed above was used as the chelating agent precursor, the mixture being aged for 1 hour.

Run 2

1,4-Naphthoquinone-2,3-dicarboxylic acid was used as the catalyst and compound (III), disclosed above was used as the chelating agent precursor, the mixture being aged for 2 hours.

Run 3

Sodium 1,2-naphthoquinone-4-sulfonate was used as the catalyst and compound (VII) disclosed above was used as the chelating agent precursor, the mixture being aged for 1 hour.

Run 4

Sodium 1,4-naphthoquinone-2-sulfonate was used as the catalyst and compound (I) disclosed above was used as the chelating agent precursor, the mixture being aged for 1.5 hours.

Each run was repeated without employing the chelating agent precursor. The gas treated in runs 1 to 3 was composed of a mixture of 6% of $CO_2$ and 94% of $N_2$ mixed with 5% of $H_2S$. In run 4, hydrogen cyanide was fed at a rate of 3 g/m³ together with the above gaseous mixture.

Operating conditions were as follows:

|  | Chelating agent precursor not used | Chelating agent precursor used |
|---|---|---|
| Catalyst concentration (mole/Kl) | 5 | 0.8 |
| Complex concentration (%) | 0 | 0.1 |
| Temperature (°C.) | 25 | 25 |
| pH of absorption medium (adjusted by sodium carbonate) | 8.5 ± 0.05 | 8.5 ± 0.5 |
| Flow rate of absorption medium (l/hr) | 2 | 2 |
| Liquid amount (l/m³ of gas) | 10 | 10 |
| Gas feed rate (l/hr) | 150 | 150 |
| Gas residence time | | |
| in absorption tube (sec) | 35 | 15 |
| in oxidation tube (min) | 10 | 6 |

Results of each run are as follows:

|  | Chelating agent precursor not used | Chelating agent precursor used | Remarks |
|---|---|---|---|
| Run 1 | 97% | 100% | desulfurization ratio |
| Run 2 | 95% | 100% | " |
| Run 3 | 96% | 100% | " |
| Run 4 | 47% | 99.8% | thiocyani-formation ratio |

The process of this invention is also effective for removing hydrogen sulfide and sulfur dioxide from a gas containing $CO_2$ at a high concentration. In other words, when the naphtho-quino chelate of this invention is employed, the pH of the absorption medium can be changed throughout the alkaline, neutral and acidic ranges optionally depending on the composition of the gas to be treated. This feature will be apparent from the following runs.

Run 5

An aqueous solution containing 0.08 mole of sodium 1,4-naphthoquinone-2-sulfonate/kl of water was mixed with 0.01% of the iron salt of compound (I) disclosed above as the chelating agent precursor to form a naphtho-quino chelate, the mixture being aged for 1.5 hours. A gas composed of a mixture of 6% of $CO_2$ and 94% of $N_2$ mixed with 5% of $H_2S$ and 1% of HCN was treated at a pH of 3.5. Although the ratio of formation of thiocyanate compound was reduced to 37%, the desulfurization ratio was maintained at 99.8%.

Run 6

An aqueous solution containing 0.5 mole of sodium 1,4-naphthoquinone-2-sulfonate/kg of water was mixed with 0.3% of the iron salt of compound (III) disclosed to form a naphtho-quino chelate compound, the mixture being aged for 1.5 hours. A gas containing 1% of $H_2S$, 60% of $CO_2$, 38% of $N_2$ and 1% of $CS_2$ was treated with the absorption medium of a pH of 3.5. The desulfurization ratio was maintained at 98% though the $CO_2$ content in the gas was very high. Absorption of $CS_2$ was hardly observed. When the above procedures were repeated with the absorption medium at a pH of 9.5, the ratio of removal of $CS_2$ was as high as 80%.

Run 7

An aqueous solution containing 0.2 mole of sodium 1,4-naphthoquinone-2-sulfonate/kl of water was mixed with 0.2% of the iron salt of compound (VI disclosed above as the chelating agent precursor to form a naphtho-quino chelate compound, the mixture being aged for 1.5 hours. Then, the aqueous solution was mixed with ethyleneglycol to form an aqueous solution containing 80% of ethyleneglycol. A gas composed of a mixture of 3% of $H_2S$, 10% of $O_2$ and 87% of $N_2$ mixed with 1.5% of $SO_2$ was treated in the same manner as in Run 1. The desulfurization ratio was 99.7% and the ratio of $SO_2$ removal was 97%.

Run 8

In this run, a mixed solvent comprising 70% of 2-ethoxyethanol, 2% of di-n-butylamine, 10% of glycerin and 18% of water was used, and it was attempted to conduct the reaction while dissolving $H_2S$, HCN and $SO_2$ sufficiently in the solvent. The above mixed solvent containing 0.5 mole/Kl of ammonium 2-methyl-1,4-naphthoquinone-3-sulfonate was incorporated with 0.06% of an iron salt of compound (I) disclosed above to form a naphtho-quino chelate compound, the mixture being aged for 1.5 hours. A gas containing 5% of $H_2S$, 2% of $SO_2$ and 1% of HCN, the balance being air, was treated with the so formed absorption medium under 2 atmospheres pressure while employing an apparatus for melting sulfur by heating and agglomerating it. The desulfurization ratio was 99.8%, the ration of $SO_2$ removal was 98% and the decyanization ratio (thiocyanate formation ratio) was 98.3%. In this run, sulfur was recovered in the form of large particles composed of pure sulfur.

Run 9

When a gas to be treated contained $SO_2$ in addition to $H_2S$, a large quantity of the gas could be treated at a maximum desulfurization efficiency with equipment of small size by employing an absorption medium mixed with water-soluble naphthoquinone per se, allowing the naphthoquinone to react with sodium bisulfite formed by the reaction of $SO_2$ in the absorption column, converting the resulting water-soluble sodium 1,4-naphthoquinone-2-sulfonate to a naphtho-quino chelate compound. The reactions involved are expressed as follows:

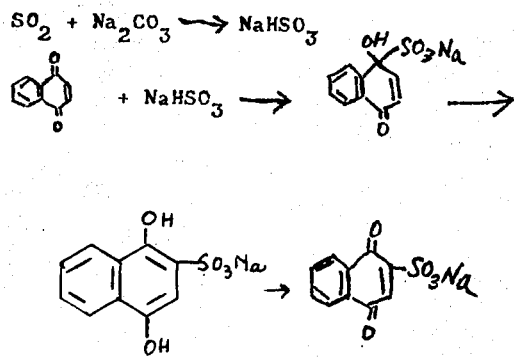

When the gas containing 0.3% of $H_2S$ and 0.18% of $SO_2$, the balance being air (gas to be treated in a Claus Furnace), was treated in the above mentioned manner, the desulfurization ratio was 100% and the ratio of $SO_2$ removal was 99.2%.

The present invention presents many advantages from the foregoing experimental results, it will readily be understood that when the naphtho-quino chelate compound of this invention is employed, the amount of the starting quinone or hydroquinone compound used can be greatly reduced. As compared with the conventional process in which the quinone or naphthoquinone compound is not converted to a naphtho-quino chelate (see U.S. Pat. No. 3,459,495), the amount of the starting quinone or naphthoquinone compound used is reduced to about one tenth, but the desulfurization ratio attained is substantially 100%. The desulfurizing effect is very conspicuous. Moreover a gas containing carbon dioxide at high concentration exceeding as much as sixty percent can be effectively treated. In addition sulfur dioxide-containing gases which are to be fed to a Claus furnace can also be easily treated.

Furthermore, since the oxidation rate in the oxidation tower is increased by the use of the chelate compound of this invention, the size of the oxidation tower can be reduced by about thirty to fifty percent and hence, the height of the absorption tower can be decreased to about two thirds. Simultaneously, it is possible to reduce the amount of the circulated absorption medium to 40% of the amount required in the conventional processes when the same amount of the gas is treated. This effect is very conspicuous when a large quantity (for example, 200,000 to 5,000,000 m3/hr) of a gas is desulfurized, and the number of towers or stages can be reduced to one half or less, as compared with the conventional processes.

Moreover, when the naphtho-quino chelate compound of this invention is employed, there is attained addition advantage in that the ratio of formation of sodium thiosulfate can be controlled below 60% which is impossible by any of the conventional wet desulfurization techniques. In addition, in the case of a gas containing hydrogen cyanide, it can be substantially converted to thiocyanate compound, and therefore, decyanization as well as desulfurization can be attained in this invention.

In the conventional wet desulfurization processes using a quinone type catalyst, iron parts of towers, tanks and the like are extremely corroded, and additional large expenditures are inevitably necessary for forming inner coatings or the like to prevent such corrosion. In contrast, in this invention using the naphtho-quino chelate compound such undesired corrosion is hardly existent in the iron parts of towers, tanks and other equipment because the metal, such as iron, is present in the chelate compound and it has no substantial metal reactive property. For example, the interval of the regular corrosion examination can be prolonged to more than 3 years. Thus, this invention makes great economical contributions to the art.

What is claimed is:

1. A process for the desulfurization of hydrogen sulfide-containing gases comprising mixing (A) a hydrogen sulfide oxidizing catalyst having a standard oxidation-reduction potential, Eo, in a range of from about 0.45 to 0.7 volt, and selected from the group consisting of quinones and hydroquinones having present therein at least one substituent selected from the group consisting of sulfonic and carboxylic acid groups and alkali and alkaline earth metal salts thereof, thioglycol, thiol, hydroxyl, lower alkyl and lower alkoxy groups with (B) a precursor of a chelating agent which is selected from the group consisting of the reaction product of a metal selected from the group consisting of the metals of groups V, VI, VII and VIII in the fourth period of the Periodic Table, arsenic and selenium with an acid selected from the group consisting of oxalic, citric, tartaric and glutaric acids; aging the mixture of (A) and (B) for from about 10 minutes to about 12 hours and forming a naphthoquino chelate compound, forming an absorption medium comprising said chelate compound, contacting a hydrogen sulfide-containing gas with said absorption medium, and absorbing the hydrogen sulfide from said gas, contacting the absorption medium with an oxidizer selected from the group consisting of air, oxygen and oxygen-containing gas, and converting said hydrogen sulfide to sulfur while regenerating said naphtho-quino chelate compound, recirculating the regenerated naptho-quino chelate compound for further use and recovering a substantially hydrogen sulfide-free gas.

2. A process according to claim 1 including converting hydrogen cyanide when present in the hydrogen sulfide-containing gas to thiocyanate.

3. A process according to claim 1 including converting sulfurous acid gas when present in the hydrogen sulfide-containing gas to sulfur.

4. A process according to claim 1 wherein the absorption medium has a pH in a range of from about 3 to about 10.

5. A process according to claim 1 wherein the absorption medium contains water, di-n-butylamine and at least one member selected from the group consisting of glycerin, monoethyleneglycol, diethyleneglycol and compounds represented by the formula $RO-(CH_2)_2-OH$ in which R is an alkyl group having 1 to 4 carbon atoms.

6. A process according to claim 1 wherein absorption and oxidation are carried out in two separate towers.

7. A process according to claim 1 wherein absorption and oxidation are carried out in two separate zones in one tower.

8. A process according to claim 1 comprising passing the hydrogen sulfide-containing gas and the oxidizer through one tower simultaneously.

9. A process according to claim 1 wherein the hydrogen sulfide-containing gas also includes sulfur dioxide and a water-soluble naphthoquinone is employed as the catalytic starting material, said naphthoquinone being converted in situ to water-soluble sulfonic acidic compound which catalyzes the reaction.

* * * * *